United States Patent
Shin et al.

(10) Patent No.: US 10,247,868 B2
(45) Date of Patent: Apr. 2, 2019

(54) OPTICAL ALIGNMENT METHOD AND PATTERNED RETARDER MANUFACTURING METHOD USING POLARIZED PULSE UV

(71) Applicant: Korea Institute of Industrial Technology, Seobuk-gu, Chungcheongnam-do (KR)

(72) Inventors: Gyo Jic Shin, Chungcheongnam-do (KR); Sang Kug Lee, Gyeonggi-do (KR); Kyung Ho Choi, Hwaseong-si (KR)

(73) Assignee: KOREA INSTITUTE OF INDUSTRIAL TECHNOLOGY, Cheonan-si, Chungcheongnam-do (KR)

( * ) Notice: Subject to any disclaimer, the term of this patent is extended or adjusted under 35 U.S.C. 154(b) by 498 days.

(21) Appl. No.: 14/888,924

(22) PCT Filed: Nov. 25, 2013

(86) PCT No.: PCT/KR2013/010740
§ 371 (c)(1),
(2) Date: Nov. 3, 2015

(87) PCT Pub. No.: WO2015/002353
PCT Pub. Date: Jan. 8, 2015

(65) Prior Publication Data
US 2016/0085010 A1    Mar. 24, 2016

(30) Foreign Application Priority Data

Jul. 2, 2013  (KR) .................... 10-2013-0077384
Jul. 2, 2013  (KR) .................... 10-2013-0077385

(51) Int. Cl.
*G02B 5/30*     (2006.01)
*B29D 11/00*    (2006.01)
(Continued)

(52) U.S. Cl.
CPC ...... *G02B 5/3083* (2013.01); *B29D 11/00644* (2013.01); *G02B 27/26* (2013.01);
(Continued)

(58) Field of Classification Search
CPC . G02B 5/3083; G02B 27/26; G02F 1/133788; G02F 2001/133631; Y10T 428/24802
See application file for complete search history.

(56) References Cited

U.S. PATENT DOCUMENTS

| | | | |
|---|---|---|---|
| 6,982,773 B2 | 1/2006 | Kurtz et al. | |
| 7,206,059 B2 | 4/2007 | Flagello et al. | |

(Continued)

FOREIGN PATENT DOCUMENTS

| | | |
|---|---|---|
| JP | 10-123523 A | 5/1998 |
| JP | 11-014995 A | 1/1999 |

(Continued)

OTHER PUBLICATIONS

International Search Report dated Mar. 24, 2014 for PCT/KR2013/010740 in 3 pages.

(Continued)

*Primary Examiner* — Gerard Higgins
(74) *Attorney, Agent, or Firm* — Rabin & Berdo, P.C.

(57) ABSTRACT

The present invention relates to a method for manufacturing a patterned retarder including an optical alignment layer or a first domain optically aligned in a first direction and a second domain optically aligned in a second direction. According to the invention, it is possible to improve productivity and to maximize optical alignment efficiency by reducing an optical alignment processing time using polarized pulse UV.

9 Claims, 23 Drawing Sheets

(51) Int. Cl.
*G02F 1/1337* (2006.01)
*G02B 27/26* (2006.01)
*G02F 1/13363* (2006.01)

(52) U.S. Cl.
CPC ............. *G02F 1/133788* (2013.01); *G02F 2001/133631* (2013.01); *Y10T 428/24802* (2015.01)

(56) References Cited

U.S. PATENT DOCUMENTS

| | | |
|---|---|---|
| 7,232,594 B2 | 6/2007 | Miroshin et al. |
| 7,391,569 B2 | 6/2008 | Ralli et al. |
| 7,583,342 B2 | 9/2009 | Maruyama et al. |
| 8,379,169 B2 | 2/2013 | Kitagawa et al. |
| 8,934,170 B2 | 1/2015 | Takeda et al. |
| 8,982,197 B2 | 3/2015 | Kim et al. |
| 9,097,938 B2 | 8/2015 | Eckert et al. |
| 2012/0300141 A1* | 11/2012 | Shin et al. |
| 2013/0035446 A1 | 2/2013 | Eckert et al. |
| 2016/0146597 A1 | 5/2016 | Shin et al. |

FOREIGN PATENT DOCUMENTS

| | | |
|---|---|---|
| JP | 2006243640 A * | 9/2006 |
| JP | 4626039 B2 | 2/2011 |
| JP | 2012-198522 A | 10/2012 |
| JP | 2013-061372 A | 4/2013 |
| KR | 10-0423213 | 6/2004 |
| KR | 10-2008-0001406 A | 1/2008 |
| KR | 10-2008-0043610 A | 5/2008 |
| KR | 10-2009-0080892 A | 7/2009 |
| KR | 10-2013-0035631 A | 4/2013 |
| KR | 10-2013-0045029 A | 5/2013 |
| KR | 1013729320000 | 3/2014 |
| WO | WO 2014/178508 A1 | 6/2014 |

OTHER PUBLICATIONS

International Search Report dated Jan. 10, 2014 for PCT/KR2013/010738 in 2 pages.
Written Opinion dated Mar. 24, 2014 for PCT/KR2013/010740 in 8 pages.
Written Opinion dated Jan. 10, 2014 for PCT/KR2013/010738 in 7 pages.

* cited by examiner

Figure 18

| | Case (1st/2nd) | Case 1 | Case 2 | Case 3 |
|---|---|---|---|---|
| POM image | | | | |
| Image 1 P,P / A | | | | |
| Image 2 P,P / A | | | | |
| 1st LP Pulse-UV Exposure | | 3.0KV, 50Hz, 0.2sec | 3.0KV, 50Hz, 0.2sec | 3.0KV, 50Hz, 0.8sec |
| 2nd LP Pulse-UV Exposure | | 3.0KV, 50Hz, 0.2sec | 3.0KV, 50Hz, 0.8sec | 3.0KV, 50Hz, 0.2sec |

OPTICAL ALIGNMENT METHOD AND PATTERNED RETARDER MANUFACTURING METHOD USING POLARIZED PULSE UV

CROSS REFERENCE TO RELATED APPLICATIONS

This application is the U.S. National Phase of International Application No. PCT/KR2013/010740, filed Nov. 25, 2013, designating the U.S. and published in Korean as WO/2015/002353 on Jan. 8, 2015 which claims the benefit of Korean Patent Application Nos. 10-2013-77384 and 10-2013-77385, both filed Jul. 2, 2013. Any and all applications for which a foreign or domestic priority claim is identified here or in the Application Data Sheet as filed with the present application are hereby incorporated by reference under 37 CFR 1.57.

TECHNICAL FIELD

The present invention relates to an optical alignment method and a patterned retarder manufacturing method, and more specifically, to a method for forming an optical alignment layer by irradiating an alignment film with polarized pulse UV, and a patterned retarder manufacturing method using the same.

BACKGROUND ART

According to advance of a liquid crystal panel manufacturing technique, liquid crystal display elements are widely used in the field of optical information process.

Conventionally, a TN (Twisted Nematic) display method is most frequently applied as a liquid crystal display element applied to small and medium displays and this is a technique of installing electrodes on two substrates, respectively, arranging liquid crystal directors to be twisted by 90°, and then applying voltage to the electrodes to operate the liquid crystal directors.

The TN liquid crystal display element provides excellent contrast and color reproducibility, and a vertical alignment (VA) mode liquid crystal display element in which longitudinal axes of liquid crystal molecules are arranged to be vertical to upper and lower display plates in a state where electric field is not applied has been prominent due to its high contrast ratio. However, the TN liquid crystal display element has a problem of a narrow viewing angle.

In order to solve such a problem of a viewing angle in the TN manner, a PVA mode (patterned vertically aligned mode) of applying an incision to a vertical alignment mode liquid crystal display device, and an IPS mode (in-plane switching mode) of forming two electrodes on one substrate and adjusting directors of liquid crystal by transverse electric field generated between two electrodes have been introduced.

Then, in order to improve a low opening ratio and transmissivity of the IPS mode, an FFS mode (fringe field switching mode) of forming a gap between a counter electrode and a pixel electrode to be narrow while forming the counter electrode and the pixel electrode are formed of transparent conductivities, and operating liquid crystal molecules by fringe field formed between the counter electrode and the pixel electrode has been emerged.

Meanwhile, in order to solve a problem that optical efficiency of the FFS mode is lower than that of the TN mode, an FIS mode was developed, thus it is possible to improve low transmissivity between pixel electrodes in the conventional FFS mode, and it is possible to achieve a liquid crystal display element capable of operating with low voltage in an voltage applying manner through two thin film transistors.

In addition, each of these modes has unique liquid crystal arrangement and optical anisotropy. Accordingly, in order to compensate for phase difference based on the optical anisotropy of the liquid crystal modes, an optical phase difference film with optical anisotropy corresponding to each mode is required. The optical phase difference film was developed as a color compensation film of an LCD, but recently, more varieties of functions such as high-wavelength decentralization, wide viewing angle, temperature compensation, and high phase difference value film are required. Recently, as requirement of customers for display devices capable of expressing a more realistic image having three dimensions, that is, capable of embodying a three-dimensional image has been increased, display devices capable of expressing a three-dimensional image have been developed in accordance with the requirement.

Generally, a three-dimensional image expressing three dimensions is formed by a phenomenon of stereo vision through two eyes, a three-dimensional image display device capable of display a three-dimensional image using parallax of two eyes, that is, binocular disparity represented since two eyes are separated by about 65 mm has been proposed.

A general three-dimensional image display device mainly includes a liquid crystal display device which displays an image, a patterned retarder which is attached to an outer face of the liquid crystal display device, and glasses which allow an image to pass through the patterned retarder from the liquid crystal display device to selectively pass.

In this case, the patterned retarder plays a role for a left eye image and a right eye image of two-dimensional images output from the liquid crystal display device to have phase values different from each other, for example, the left eye image is left circularly polarized and the right eye image is right circularly polarized, and it is necessary to form multi-domains optically aligned at angles different from each other. Concerning such a patterned retarder and its manufacturing method thereof, a plurality of applications such as Korean Laid-Open Patent Publication No. 10-2013-0035631 are disclosed.

In the case of a liquid crystal display device, it is general that alignment of liquid crystal molecules controlled in advance is changed to another alignment state by applying electric field, a polarization direction or a polarization state of passing light is changed, and this change is displayed by changing to contrast of brightness by a polarizer or the like.

As a general method of aligning liquid crystal, a contact rubbing method of applying a polymer film such as polyimide to a substrate such as glass and rubbing this surface in a predetermined direction with fiber such as nylon polyester is used. Liquid alignment based on the contact rubbing method described above has an advantage of obtaining simple and stable alignment performance of liquid crystal. However, when the polymer film is rubbed with fiber, fine dust and electrostatic discharge (ESD) occurs to damage the substrate and, according to enlargement of rolls caused by increase in processing time and enlargement of glass, a serious problem may be caused during manufacturing a liquid crystal panel due to difficulty in process such as unevenness of rubbing strength.

In order to solve the problem of the contact rubbing method described above, new methods for manufacturing a non-contact alignment film have been actively studied. As the methods for manufacturing a non-contact alignment film, there are an optical alignment method, an energy beam alignment method, a vapor deposition alignment method, an etching method using lithography, and the like.

Particularly, the optical alignment method means mechanism of forming a photopolymerization liquid crystal alignment film in which a photoreactive material coupled to photoreactive polymer causes optical reaction by linearly polarized UV to have predetermined arrangement, thereby aligning liquid crystal finally.

To this end, when linearly polarized UV is irradiated, a photoreactive material has to have characteristics of being arranged at a predetermined angle and in a predetermined direction according to a polarization direction, and has to be well matched to reactive liquid crystal to well achieve liquid crystal alignment by interaction with reactive liquid crystal. Particularly, an optical alignment material forming an optical alignment film has to be good in physical properties such as printing property, alignment stability, and thermal stability.

As optical reaction based on UV irradiation, photopolymerization reaction of cinnamate, coumarin, syalkon, stilbene, diazo, and the like, photoisomerizable reaction of cis-trans isomerization, and molecular chain break of decomposition have already been known. There are examples of applying such molecular optical reaction based on UV to liquid crystal alignment based on UV irradiation through design of appropriate alignment film molecules and optimization of UV irradiation conditions.

For example, Korean Registered Patent Publication No. 10-0423213 discloses a manufacturing method of a liquid crystal alignment film and a liquid crystal display element having the liquid crystal alignment film, wherein alignment performance is granted by irradiation of linearly polarized UV without performing a rubbing process. Particularly, in Japan, Korea, Europe, USA, and the like related to LCD industries, a lot of patents related to such optical alignment methods have been applied. However, after the initial idea has been derived, they have not have been generally and widely applied in industrial field although some have been in mass production.

This is the reason why simple liquid crystal alignment can be induced by the optical reaction but stable alignment characteristics cannot be maintained or provided in terms of external heat, light, physical impact, chemical impact, and the like. In other words, the optical alignment method is low in productivity or reliability as compared with the rubbing method. The main causes of such problems are alignment anchoring energy lower than that of the rubbing method, low alignment stability of liquid crystal, and the like.

SUMMARY OF INVENTION

Technical Problem

The invention has been made to solve the problems described above, and an object of the invention is to provide an optical alignment method and a patterned retarder manufacturing method using polarized pulse UV having an effect of improvement in productivity due to maximization of efficiency of optical alignment by reducing a processing time of an optical alignment agent using polarized pulse UV.

Solution to Problem

According to a preferred embodiment of the invention, there is provided an optical alignment method using polarized pulse UV comprising the steps of: (a) preparing a substrate; (b) forming a photoreactive layer by applying a photoreactive agent onto the substrate; and (c) forming an optical alignment layer by irradiating the photoreactive layer by irradiating the photoreactive layer with polarized pulse UV.

According to another embodiment of the invention, there is provided a patterned retarder manufacturing method using polarized pulse UV, including the steps of: (a) preparing a substrate; (b) forming a photoreactive layer by applying a photoreactive agent onto the substrate; and (c) forming an optical alignment layer in which a stripe-type first domain and second domain alternately continue by exposing the photoreactive layer, wherein the first domain is optically aligned in a first direction by polarized pulse UV, and the second domain is optically aligned in a second direction by polarized pulse UV.

Herein, the step (c) including the steps of: (c-1) exposing the whole face by irradiating the photoreactive layer with polarized pulse UV polarized in a first direction; and (c-2) irradiating the photoreactive layer with polarized pulse UV polarized in a second direction, wherein an area corresponding to the first domain is blocked using a photo-mask, and only an area corresponding to the second domain are partially exposed.

In this case, it is preferable that the exposure time and the exposure energy in the step (c-2) are greater than the exposure time and the exposure energy in the step (c-1).

In addition, the patterned retarder manufacturing method may further include a step (d) of applying reactive liquid crystal onto the optical alignment layer exposed secondarily, drying, and hardening the liquid crystal.

In this case, it is preferable that the polarized pulse UV has energy of 0.1 mJ/pulse to 500 J/pulse.

In addition, it is preferable that the polarized pulse UV is irradiated at 1 Hz to 60 Hz.

In addition, it is preferable that flash voltage of the polarized pulse UV is 1 kV to 4 kV.

In addition, it is preferable that an exposure time based on the polarized pulse UV is 0.1 seconds to 10.0 seconds.

Moreover, it is preferable that an exposure distance based on the polarized pulse UV is 0.5 cm to 10.0 cm.

BRIEF DESCRIPTION OF DRAWINGS

FIG. 18 is a polarized optical microscope photograph illustrating comparison of alignment according to a 0°/45° multi-domain forming method at the time of polarized pulse UV exposure.

DESCRIPTION OF EMBODIMENTS

Figure 1:
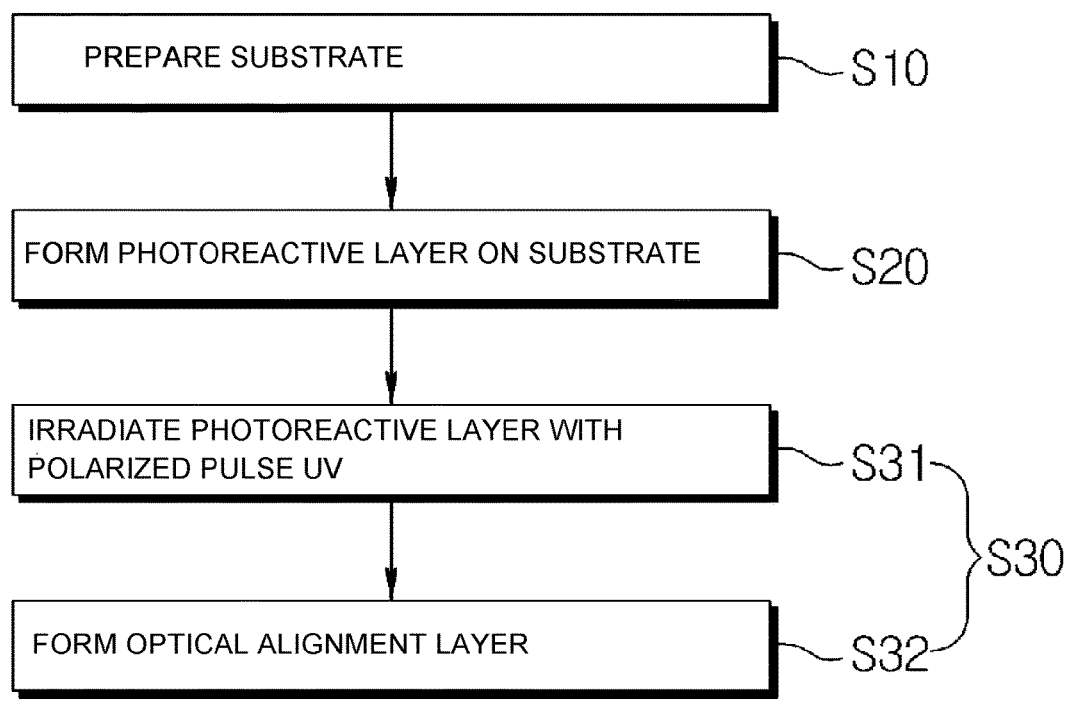
FIG. 1 is a flowchart illustrating an optical alignment method using polarized pulse UV according to an embodiment of the invention.

Hereinafter, preferred embodiments of an optical alignment method and a patterned retarder manufacturing method using polarized pulse UV according to the invention will be described with reference to the accompanying drawings. In this course, thicknesses of lines and sizes of constituent elements illustrated in the drawings may be illustrated to be magnified for clarity and convenience of description.

In addition, terms to be described later are terms defined considering functions in the invention, and may be varied according to intends of users and operators or convention. Therefore, the definition for such terms should be based on the overall contents of the specification.

Moreover, the following embodiment does not limit the scope of rights, is merely exemplary items of constituent elements presented in Claims of the invention, and is included in the technical spirit throughout the specification of the invention, and an embodiments including constituent elements which can be replaced as equivalents in the constituent elements of Claims may be included in the scope of rights of the invention.

FIG. 1 is a flowchart illustrating an optical alignment method using polarized pulse UV according to an embodiment of the invention. Hereinafter, an optical alignment method using polarized pulse UV according to an embodiment of the invention will be described with reference to FIG. 1.

Step of Preparing Substrate (S10):

A substrate for forming an optical alignment layer on a surface is prepared. The substrate may be selected in various standards as necessary, and is formed of a transparent insulating substrate such as a glass substrate, a film, a flexible substrate, etc. In this case, the film may formed of any one of TAC (tri-acetate cellulose), COP (cyclo olefin polymer), COC (cyclic olefin copolymer), PVA (poly vinyl alcohol), PC (poly carbonate), PMMA (poly methyl methacrylate), PET (polyethylene terephthalate), PEN (polyethylene naphthalate), PES (polyethersulfone), PS (polystyrene), PI (poly imide), polyarylate, and PEEK (polyetheretherketon).

Step of Forming Photoreactive Layer on Substrate (S20):

A photoreactive layer that is an alignment film is formed by applying a photoreactive agent onto the surface of the prepared substrate. Herein, the photoreactive agent may be formed of, for example, a substance based on polyimide, polyvinyl, polysiloxane, and polyacryl including photoreaction such as cinnamate, syalkon, coumarin, stilbene, diazo, etc.

Step of Forming Optical Alignment Layer by Irradiating Photoreactive Layer with Polarized Pulse UV (S30):

The photoreactive layer formed on the substrate is irradiated with polarized pulse UV (S31), to form an optical alignment layer having a pretilt angle (S32).

In the convention optical alignment method, UV (ultra violet) having predetermined energy is continuously irradiated for a predetermined time, but in the invention, UV having high energy is irradiated in a pulse form. Such pulse UV is irradiated only for a very short time, and is cooled for a relatively long time. In other words, since a duty cycle (time when pulse is turned/total time when pulse is repeated×100(%)) has a very small value less than 1%, overall, the UV irradiation time is short, the cooling time is long, and thus there is an advantage that heat is not generated during a pulse UV irradiation process.

Figure 2:
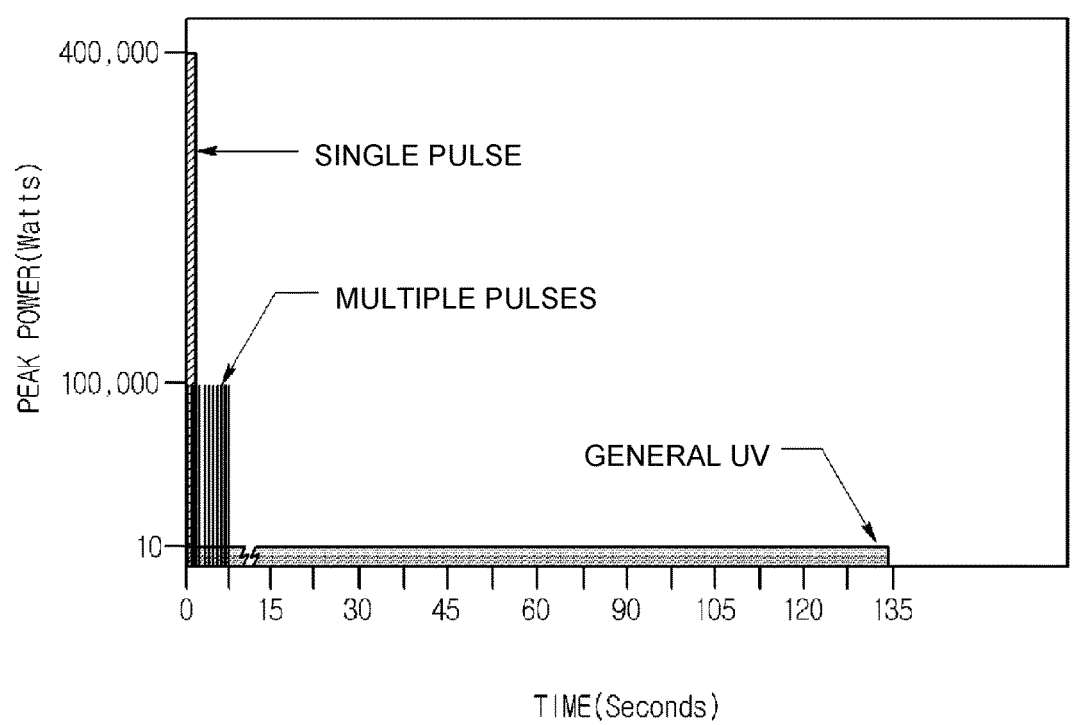
FIG. 2 is a graph illustrating comparison of peak power between general UV and pulse UV.

FIG. 2 illustrates comparison of peak power and irradiation time when general UV and pulse UV are irradiated with the same energy of 1,200 Watt-seconds.

The general UV having peak power of 10 Watts is irradiated for 120 seconds, whereas the pulse UV having a pulse width of 1 millisecond and peak power of 100,000 Watts is irradiated with 12 pulses (multiple pulses) for 12 seconds, and the pulse UV having a pulse width of 3 milliseconds and peak power of 400,000 Watts is irradiated with one pulse (single pulse). In other words the pulse UV can irradiate the same energy for an extremely short time as compared with the general UV.

According to the embodiment of the invention, the polarized pulse UV may be irradiated with a pulse width of 20 microseconds or less, a waveform of 1 to 60 Hz per second, and 0.1 mJ/pulse to 500 J/pulse, and thus there is an advantage of reducing a processing time due to reduction of a light irradiation time at the time of optical alignment and to thereby improve productivity. In this case, it is preferable that flash voltage of the polarized pulse UV is 1 kV to 4 kV, and an exposure time is 0.1 seconds to 10.0 seconds.

Meanwhile, in a light emitting lamp, as a distance from a surface of an object gets longer, difference between light intensity of a spot corresponding to a lamp center and light intensity of an ambient portion thereof occurs more severely. Accordingly, light intensity and uniformity of the UV light emitted from the UV lamp at the time of optical alignment gets more excellent as getting closer to the substrate but, in the convention case, the minimum exposure distance has to be kept due to thermal deformation directly applied to the substrate. Generally, an exposure distance of about 10 to 15 cm is secured. In this case, there is difference of about 30% in the uniformity between the center and the ambient portion irradiated to the substrate.

However, when the pulse UV is irradiated according to the embodiment of the invention, heat occurrence is substantially insignificant. Accordingly, there is no thermal influence on the surface of the substrate, and thus it is possible to keep the uniformity of UV light to be a level of substantially 100% by irradiating the pulse UV as close to the surface of the substrate as possible. According to the embodiment of the invention, it is preferable that an exposure distance of polarized pulse UV is 0.5 cm to 10.0 cm.

In addition, the polarized pulse UV is irradiated as a momentary pulse wave for an ultra-short time, and has strong penetration at the time of optical alignment. As a result, the polarized pulse UV can perform optical alignment on a thick layer in which a photoreactive layer is thick.

In terms of costs, in the case of the polarized pulse UV lamp, it is possible to reduce power consumption by 80% or more as compared with the case of using the conventional arc discharge UV lamp. The reason is because polarized pulse UV uses momentary UV energy and thus power consumption is reduced.

In addition, the polarized pulse UV can have a momentary ON/OFF function. Accordingly, when the UV irradiation is unnecessary on process flow, the UV lamp can be turned off, thus there is an energy saving effect, and a separate opening and closing device such as a shutter is not necessary. Moreover, replacement costs of expendables such as a cold mirror and a hot mirror used at the time of conventional optical alignment using general UV are not necessary, and thus there is an advantage in economic aspects.

Comparison of Alignment According to Exposure Time when Using General Polarized UV and Polarized Pulse UV In the case of forming an optical alignment layer by irradiating general UV and the case of forming an optical alignment layer by irradiating pulse UV, in order to compare alignment according to each exposure time, a liquid crystal cell was manufactured and used as follows.

First, a glass substrate or a triacetate (TAC) substrate was used as a substrate, and a photoreactive agent in which an optical alignment substance was dissolved in a 1% MEK/toluene organic solvent was applied onto the substrate to form a photoreactive layer.

Thereafter, an optical alignment layer was formed by irradiating the photoreactive layer with general polarized UV and polarized pulse UV at an exposure distance of 7 cm for 0.1 second and 0.4 seconds, respectively, and reactive liquid crystal was dissolved in 12% toluene organic solvent, and was applied and dried.

In this case, the general polarized UV was irradiated at power density of 10.5 mW/cm$^2$, and the polarized pulse UV was irradiated with flash voltage of 3 kV and frequency of 50 Hz.

Figure 3:
FIG. 3 is a polarized optical microscope photograph of general UV and pulse UV according to an exposure time.
Figure 4:
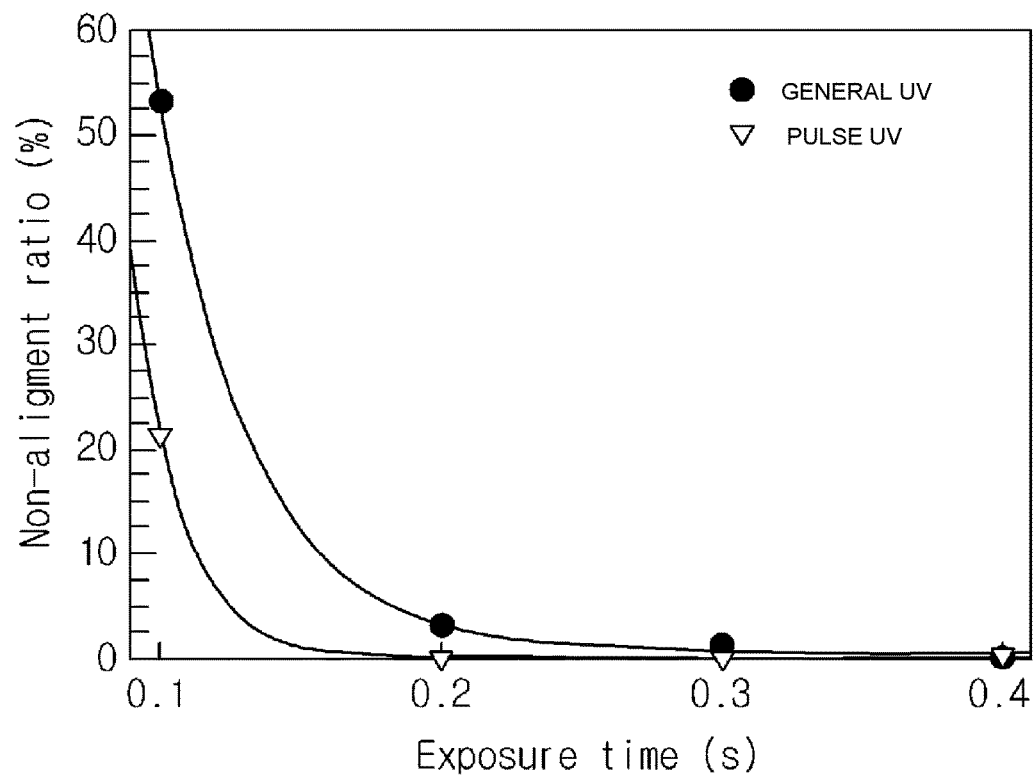
FIG. 4 is a graph illustrating comparison of non-alignment distribution of an optical alignment layer between general UV and pulse UV according to an exposure time.
Figure 5:
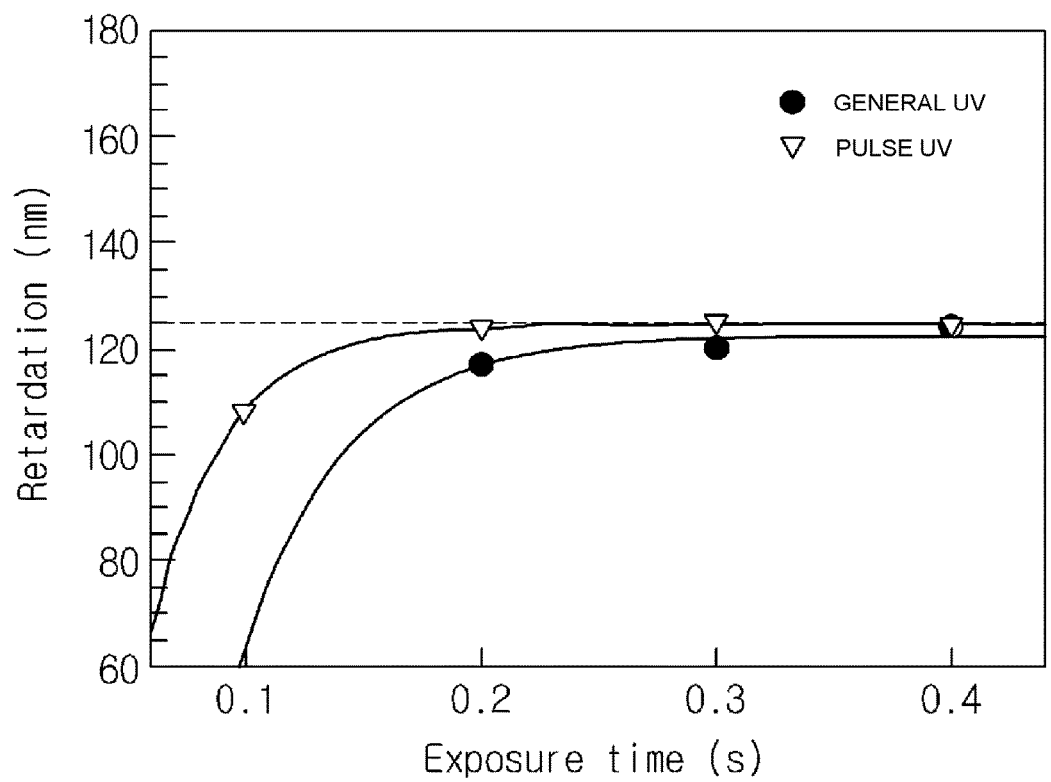
FIG. 5 is a graph illustrating comparison change in phase difference of an optical alignment layer between general UV and pulse UV according to an exposure time.

FIG. 3 is a polarized optical microscope photograph of a general UV and a pulse UV according to an exposure time, FIG. 4 is a graph illustrating comparison of non-alignment distribution of an optical alignment layer between general UV and pulse UV according to an exposure time, and FIG. 5 is a graph illustrating comparison of change in phase difference of an optical alignment layer between general UV and pulse UV according to an exposure time.

As illustrated in FIG. 3, in both cases of irradiating general polarized UV and irradiating polarized pulse UV, non-alignment distribution was more decreased as the exposure time got longer, and a white image was clearly displayed. However, as illustrated in FIG. 4, in the case of irradiating the general polarized UV, the non-alignment distribution fell to 1% or less when the exposure time reached 0.4 seconds, whereas in the case of irradiating the polarized pulse UV, the non-alignment distribution fell to 1% or less even when the exposure time was 0.2 seconds, and In this case, a black image and a white image were clearly displayed as illustrated in FIG. 3.

In other words, it can be known that there is an effect of reducing an optical alignment processing time by about 50% due to improvement of an optical alignment speed when the optical alignment layer is formed by irradiating the polarized pulse UV according to the embodiment of the invention.

In addition, according to the general polarized UV, exposure energy of 5.0 mJ/cm$^2$ was consumed for 0.4 seconds until the non-alignment distribution was represented by 1% or less, whereas when the optical alignment layer was formed by irradiating the polarized pulse UV according to the embodiment of the invention, exposure energy of 3.2 mJ/cm$^2$ was consumed for 0.2 seconds. Therefore, according to the embodiment of the invention, there is an exposure energy saving effect of about 36% as compared with the conventional.

Moreover, FIG. 5 illustrates that phase difference is converged in a predetermined range (for example, 125 nm±10 nm) within an earlier time when using the polarized pulse UV as compared with the case of using the general polarized UV, which represents that alignment is achieved for a shorter time.

Comparison of Alignment According to Exposure Distance when Using Polarized Pulse UV In the case of forming the optical alignment layer by irradiating polarized pulse UV, in order to compare alignment according to an exposure distance, a liquid crystal cell was manufactured and used as follows.

First, a glass substrate or a triacetate (TAC) substrate was used as a substrate, and a photoreactive agent in which an optical alignment substance was dissolved in a 1% MEK/toluene organic solvent was applied onto the substrate to form a photoreactive layer.

Thereafter, while changing an exposure distance to 1.5 cm, 3 cm, 4, cm, and 7 cm, an optical alignment layer was formed by irradiating a photoreactive layer with polarized pulse UV in a severe condition of an exposure time of 0.1 seconds, and the reactive liquid crystal was dissolved in 12% toluene organic solvent, and was applied and dried.

In this case, the polarized pulse UV was irradiated with flash voltage of 3 kV and frequency of 50 Hz.

Figure 6:
FIG. 6 is a polarized optical microscope photograph according to an exposure distance of polarized pulse UV.
Figure 7:
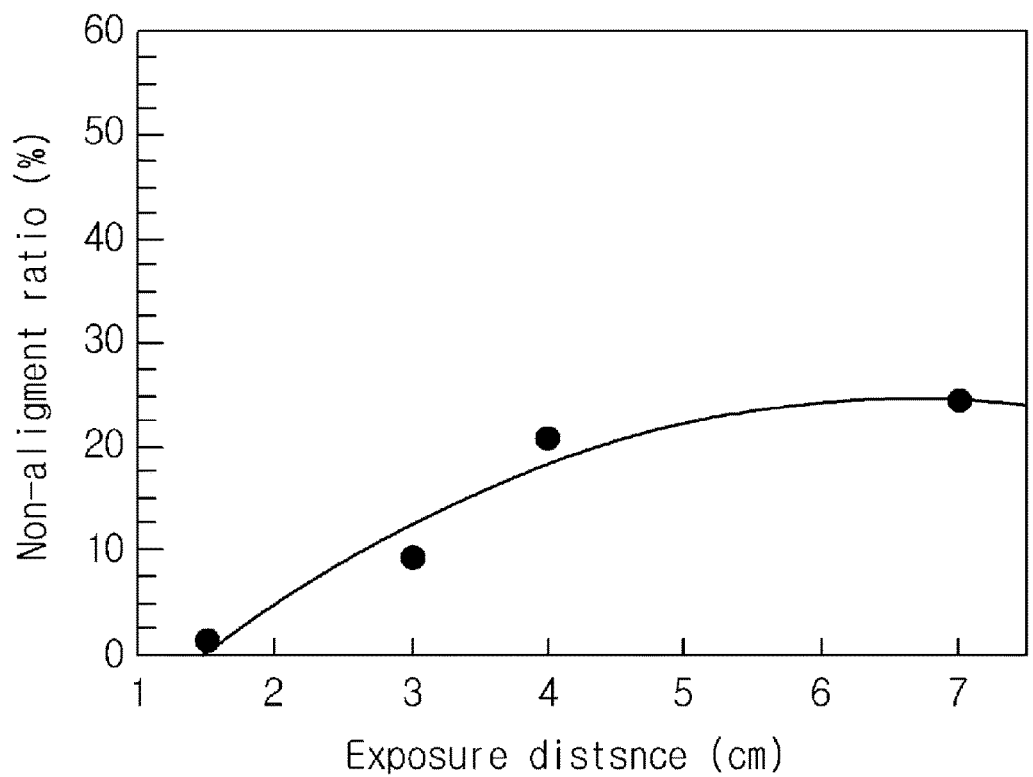
FIG. 7 is a graph illustrating non-alignment distribution of an optical alignment layer according to an exposure distance of polarized pulse UV.

FIG. 6 is a polarized optical microscope photograph of polarized pulse UV according to an exposure distance, and FIG. 7 is a graph illustrating non-alignment distribution of an optical alignment layer according to an exposure distance of polarized pulse UV.

As illustrated in FIG. 6 and FIG. 7, as an exposure distance between a UV lamp irradiating polarized pulse UV and an exposure face (photoreactive layer) gets closer, non-alignment distribution gets smaller, and a black image and a white image are more clearly displayed. Meanwhile, as the exposure distance gets larger, non-alignment distribution is more increased, and clarity of the black image and the white image is more decreased. When the exposure distance exceeded 7 cm, change of non-alignment distribution according to the increase of the exposure distance was insignificant.

Figure 8:
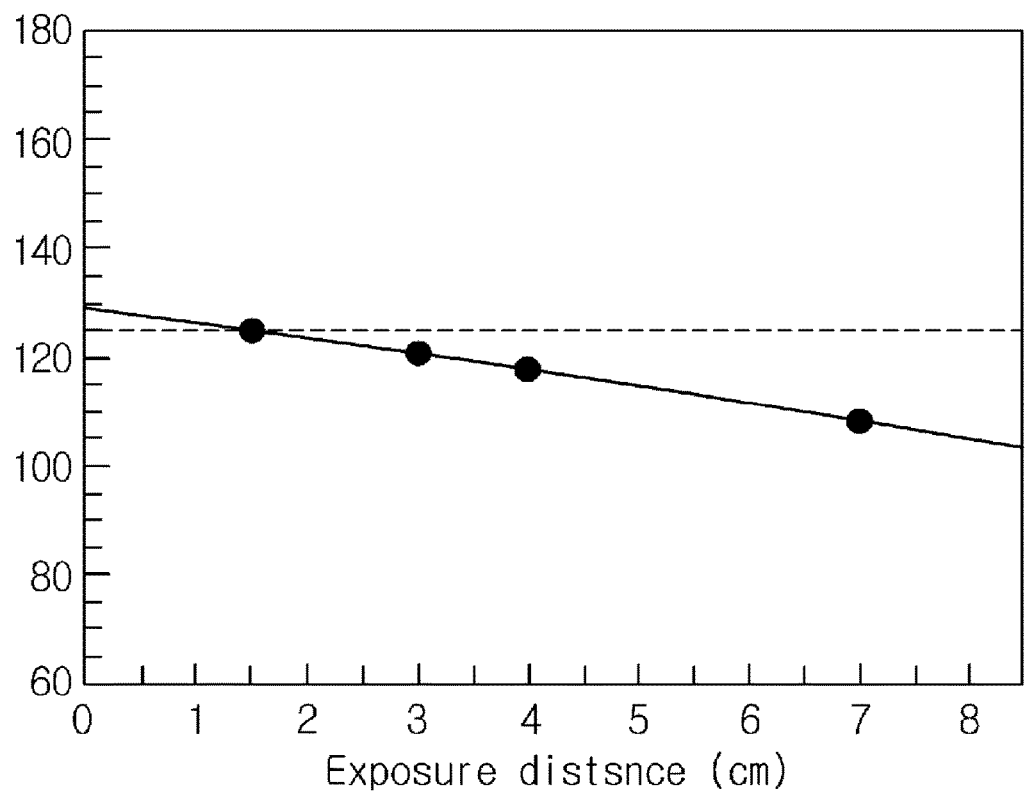
FIG. 8 is a graph illustrating change in phase difference of an optical alignment layer according to an exposure distance of polarized pulse UV.

FIG. 8 is a graph illustrating change in phase difference of an optical alignment layer according to an exposure distance of polarized pulse UV, wherein it can be seen that the phase difference is decreased in a predetermined slope according to the increase of the exposure distance.

Comparison of Alignment for Each Flash Voltage and for Each Frequency when Using Polarized Pulse UV When an optical alignment layer is formed by irradiating polarized pulse UV, in order to compare alignment for each voltage and for each frequency of polarized pulse UV light, a liquid crystal cell was manufactured and used as follows.

First, a glass substrate or a triacetate (TAC) substrate was used as a substrate, and a photoreactive agent in which an optical alignment substance was dissolved in a 1% MEK/toluene organic solvent was applied onto the substrate to form a photoreactive layer.

Thereafter, an optical alignment layer was formed by irradiating the photoreactive layer with polarized pulse UV for an exposure time of 0.2 second at an exposure distance of 1.5 cm, and reactive liquid crystal was dissolved in 12% toluene organic solvent, and was applied and dried. In this case, flash voltage of the polarized pulse UV was set to 2.0 kV, 2.5 kV, and 3.0 kV, and polarized pulse UV with frequency of 1 Hz, 20 Hz, 30 Hz, 40 Hz, and 50 Hz was irradiated in each flash voltage.

Figure 9:
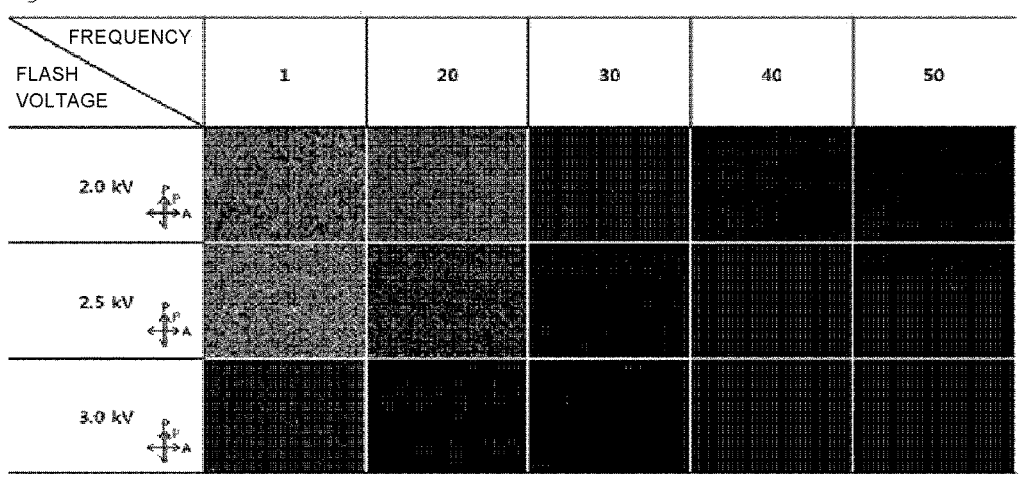
FIG. 9 is a polarized optical microscope photograph for each flash voltage and for each frequency of pulse UV at an exposure distance of 1.5 cm.
Figure 10:
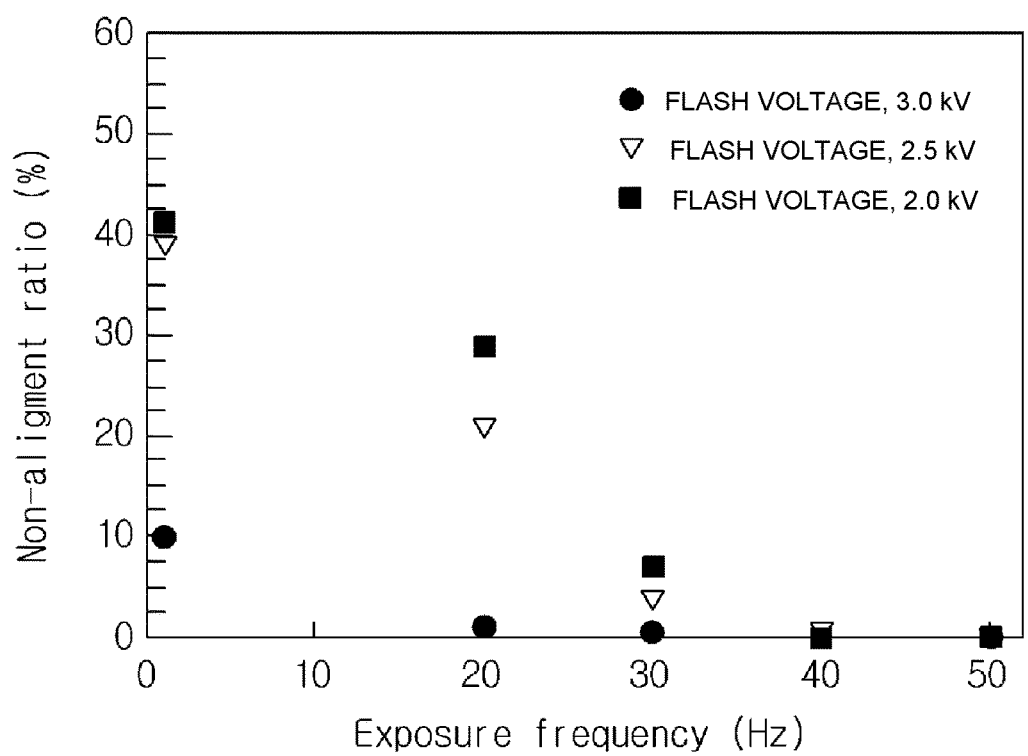
FIG. 10 is a graph illustrating non-alignment distribution of an optical alignment layer for each flash voltage and for each frequency of pulse UV at an exposure distance of 1.5 cm.
Figure 11:
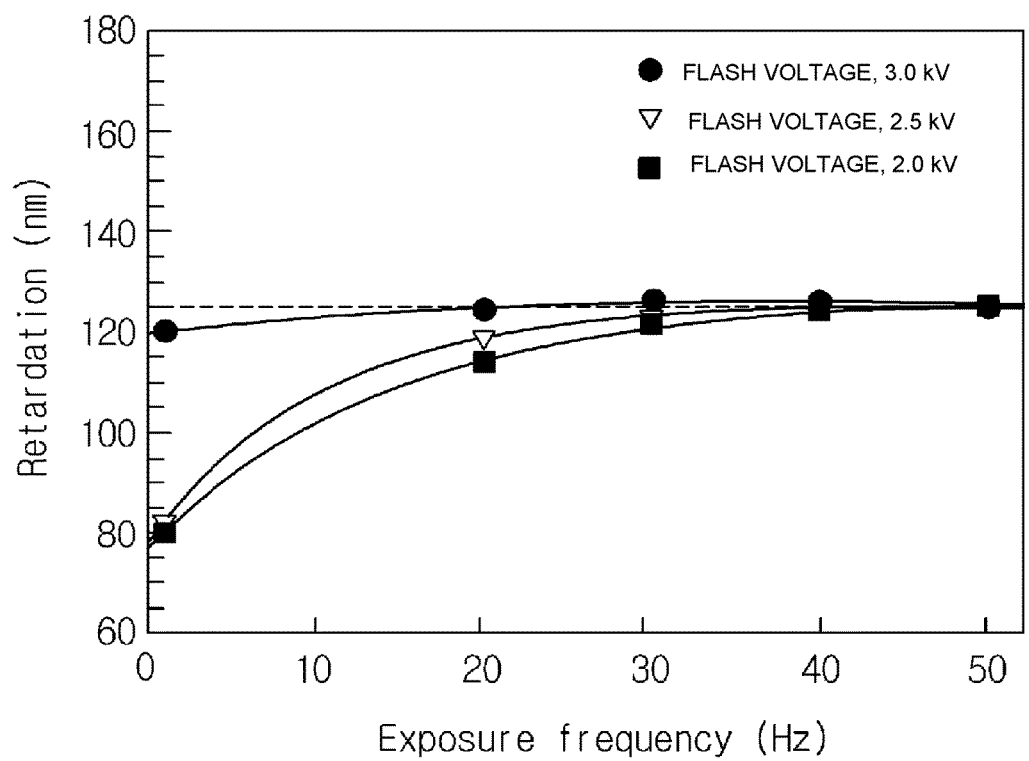
FIG. 11 is a graph illustrating comparison of change in phase difference of an optical alignment layer for each flash voltage and for each frequency of pulse UV at an exposure distance of 1.5 cm.

FIG. 9 is a polarized optical microscope photograph for each flash voltage and for each frequency of pulse UV at an exposure distance of 1.5 cm, FIG. 10 is a graph illustrating non-alignment distribution of an optical alignment layer for each flash voltage and for each frequency of pulse UV at an exposure distance of 1.5 cm, and FIG. 11 is a graph illustrating comparison of change in phase difference of an optical alignment layer for each flash voltage and for each frequency of pulse UV at an exposure distance of 1.5 cm.

FIG. 9 and FIG. 10 illustrate that, as the frequency of the polarized pulse UV is more raised and as the flash voltage of the polarized pulse UV is more raised, non-alignment distribution is decreased and a black image and a white image area clearly displayed.

In addition, FIG. 11 illustrates that, as the flash voltage of the polarized pulse UV is more raised, the alignment can be achieved at lower frequency.

Particularly, when the frequency of the polarized pulse UV is higher than 40 Hz, non-alignment distribution was 1% or less even in flash voltage of 2.0 kV, and non-alignment distribution was 1% or less at frequency of 20 Hz when flash voltage was 3 kV. In other words, when the flash voltage of the polarized pulse UV was 3 kV, an optimal black image was embodied at frequency of 20 Hz, and non-alignment distribution was minimum. When the flash voltage of the polarized pulse UV was 2.0 kV and 2.5 kV, an optimal black image was embodied at frequency of 40 Hz, and non-alignment distribution was minimum.

Figure 12:
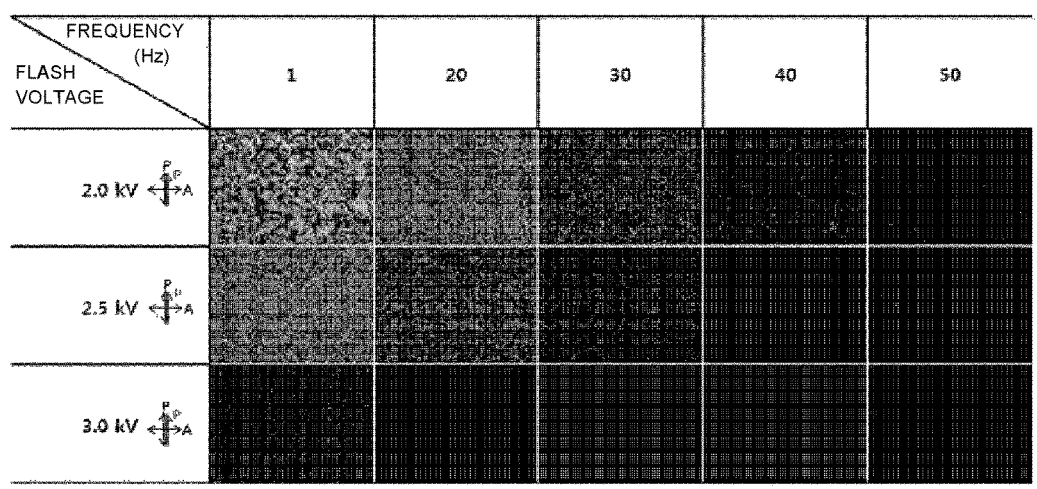
FIG. 12 is a polarized optical microscope photograph for each flash voltage and for each frequency of pulse UV at an exposure distance of 7.0 cm.
Figure 13:
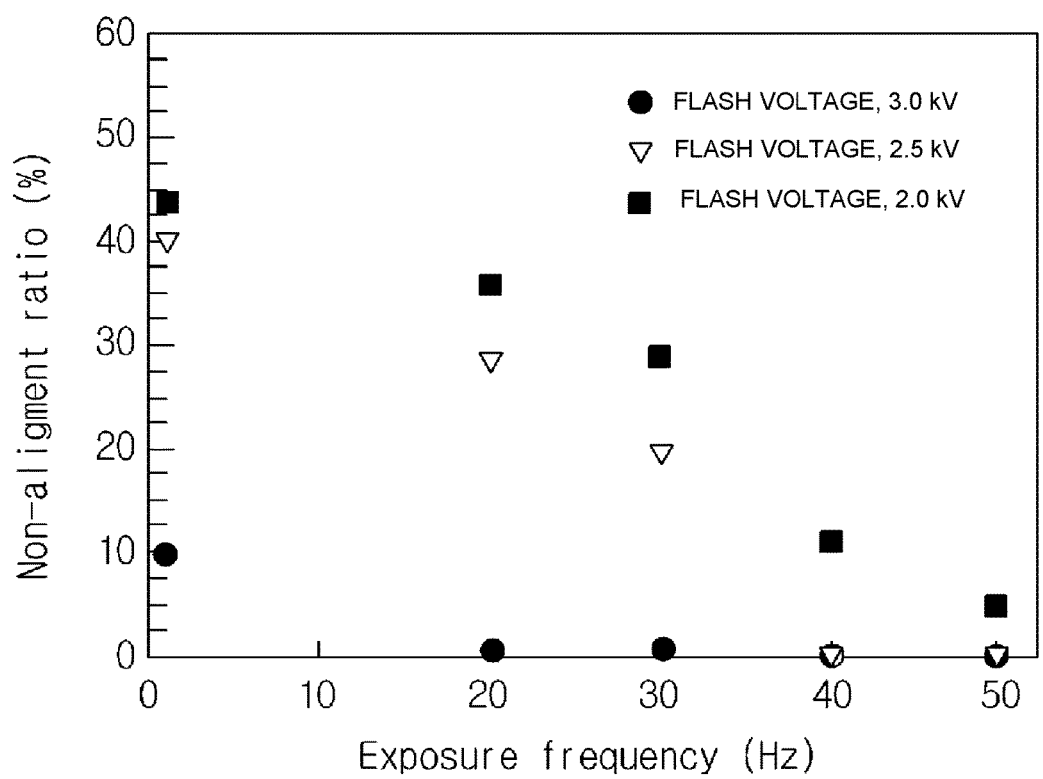
FIG. 13 is a graph illustrating non-alignment distribution of an optical alignment layer for each flash voltage and for each frequency of pulse UV at an exposure distance of 7.0 cm.
Figure 14:
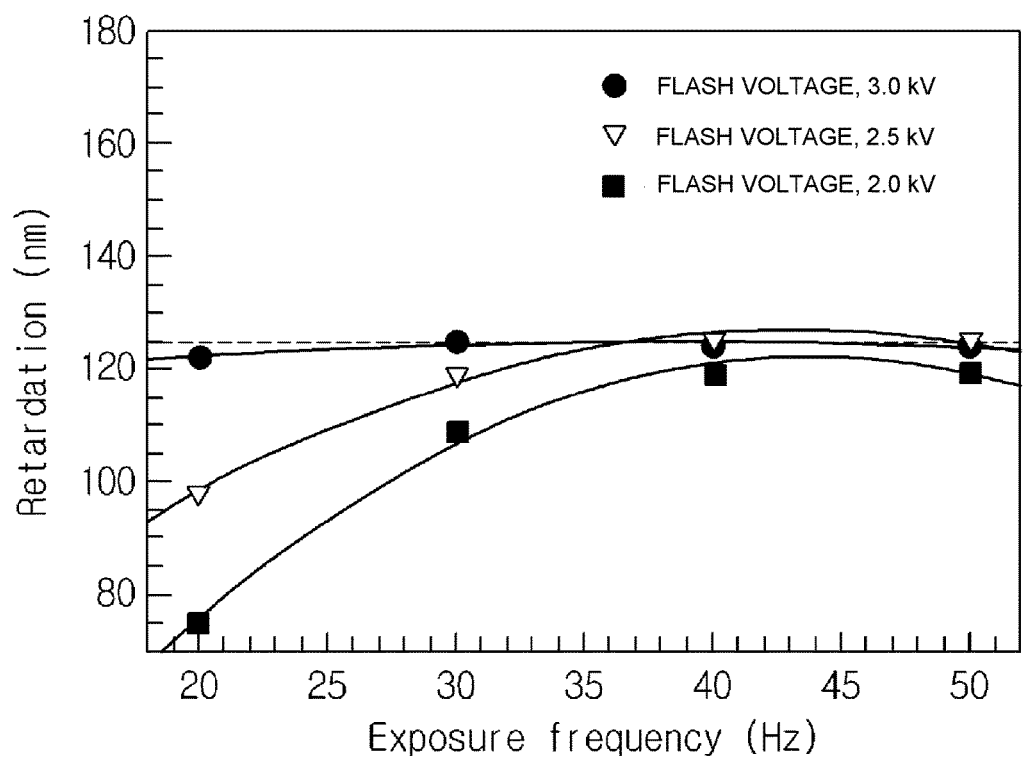
FIG. 14 is a graph illustrating comparison of change in phase difference of an optical alignment layer for each flash voltage and for each frequency of pulse UV at an exposure distance of 7.0 cm.

Meanwhile, FIG. 12 is a polarized optical microscope photograph for each flash voltage and for each frequency of pulse UV at an exposure distance of 7.0 cm, FIG. 13 is a graph illustrating non-alignment distribution of an optical alignment layer for each flash voltage and for each frequency at an exposure distance 7.0 cm, and FIG. 14 is a graph illustrating comparison of change in phase difference of an optical alignment for each flash voltage and for each frequency of pulse UV at an exposure distance of 7.0 cm.

Referring to FIG. 12 to FIG. 14, when the exposure distance is increased from 1.5 cm to 7.0 cm, it can be known that an optical black image is embodied at frequency of 20 Hz when the flash voltage of the polarized pulse UV is 3 kV and at frequency of 40 Hz when the flash voltage is 2.5 kV. Moreover, when the exposure distance 7 cm, a result that non-alignment distribution is overall increased as compared with the experiment example of the exposure distance of 1.5 cm described above is represented, and this is caused by a light leakage phenomenon of a liquid crystal outer portion according to the increase of the exposure distance.

Comparison of Pretilt Angle when Using General Polarized UV and Polarized Pulse UV In the case of forming an optical alignment layer by irradiating general UV and the case of forming an alignment layer by irradiating pulse UV, in order to compare pretilt angles according to each exposure time, a liquid crystal cell was manufactured and used as follows.

First, a glass substrate or a triacetate (TAC) substrate was used as a substrate, and a photoreactive agent in which an optical alignment substance was dissolved in a 1% MEK/toluene organic solvent was applied onto the substrate to form a photoreactive layer.

Thereafter, optical alignment layers were formed by irradiating optical reactive layers with general polarized UV and polarized pulse UV for 0.1 seconds and 0.4 seconds, respectively, at an exposure distance 7 cm, and liquid crystal layers were formed of twisted nematic (TN) liquid crystal.

In this case, the general polarized UV was irradiated at power density of 10.5 mW/cm$^2$, and the polarized pulse UV was irradiated with flash voltage of 3 kV and frequency of 50 Hz.

Figure 15:
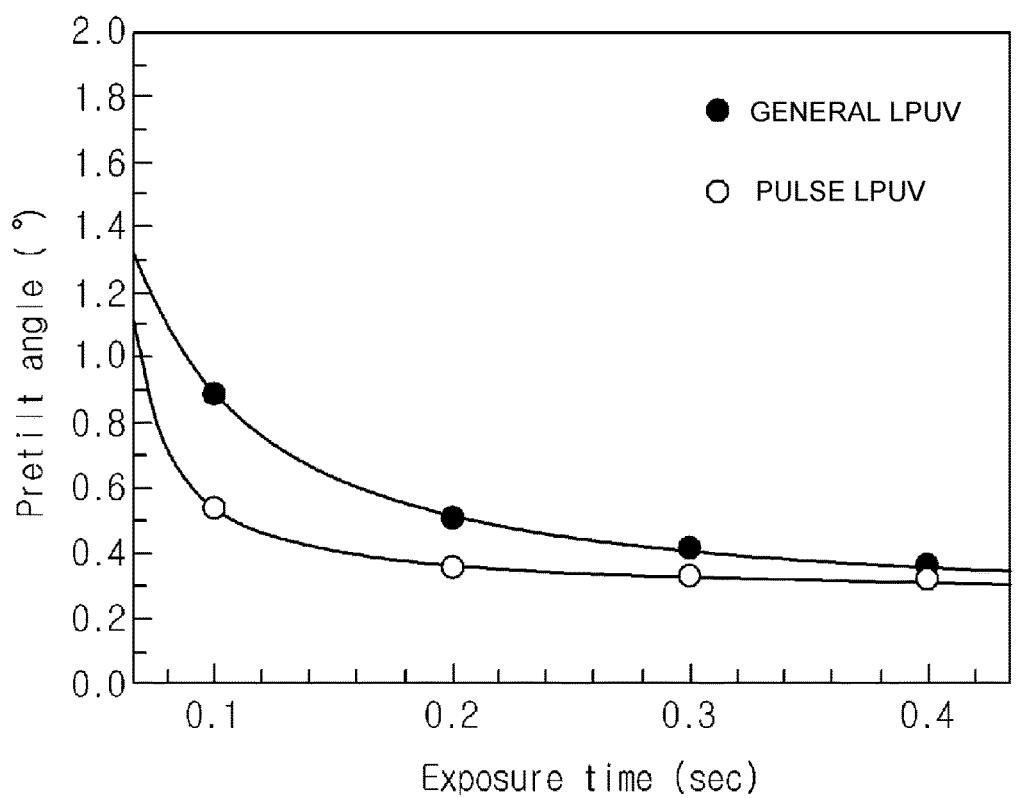
FIG. 15 is a graph illustrating comparison of a pretilt angle between general UV and pulse UV according to an exposure time.

FIG. 15 is a graph illustrating comparison of pretilt angles according to an exposure time between general polarized UV and pulse polarized UV. As illustrated in FIG. 15, in both of the case of irradiating general polarized UV and the case of irradiating polarized pulse UV, a pretilt angle tends to decrease according to increase of an exposure time.

However, in the case of exposing by the polarized pulse UV, the pretilt angle is represented lower than the case of exposing by the general polarized UV. In the case of the polarized pulse UV, the pretilt angle is converged to a predetermined value after the exposure time of 0.2 seconds passes, whereas in the case of the general polarized UV, alignment is performed after the exposure time of 0.4 seconds passes. In other words, when the polarized pulse UV is used according to the embodiment of the invention, it can be known that it is possible to embody excellent horizontal alignment with less energy.

Figure 16:
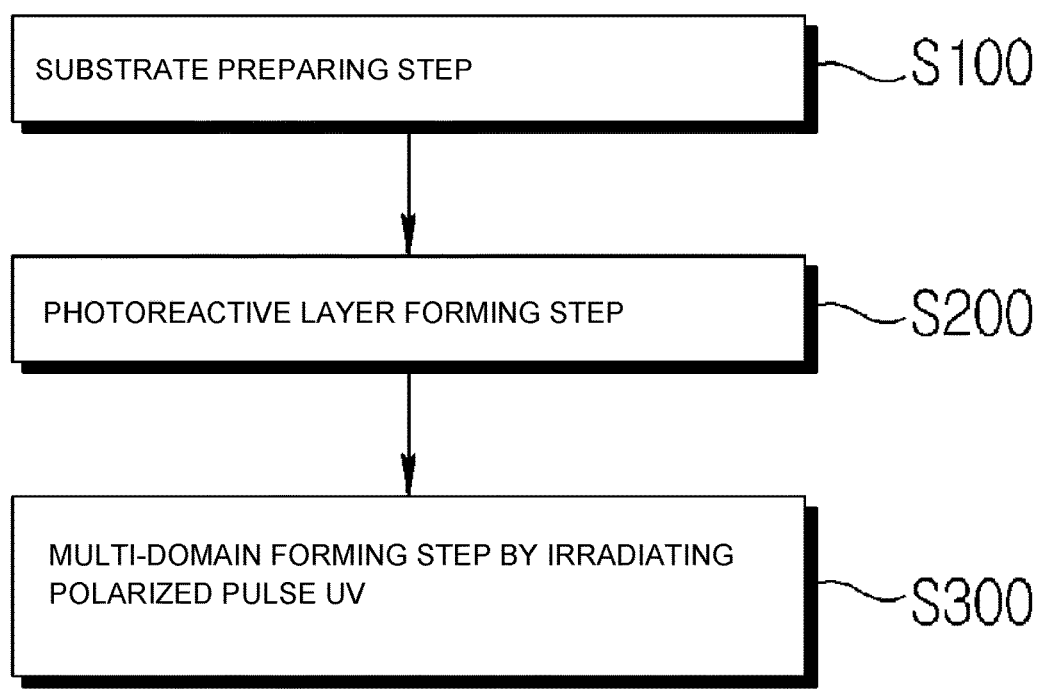
FIG. 16 is a flowchart illustrating a patterned retarder manufacturing method using polarized pulse UV according to an embodiment of the invention.
Figure 17A:
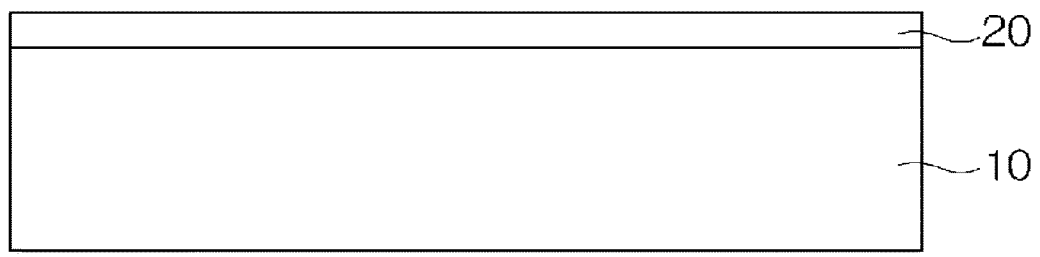
FIG. 17a to FIG. 17c are flowcharts illustrating stepwise a patterned retarder manufacturing method using polarized pulse UV according to an embodiment of the invention.
Figure 17B:
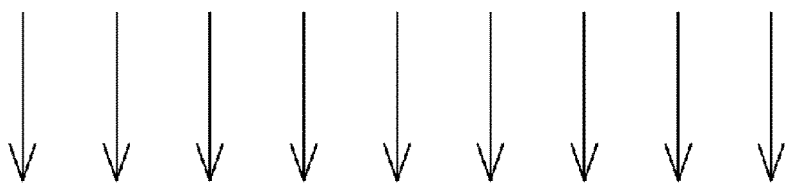
Figure 17B:
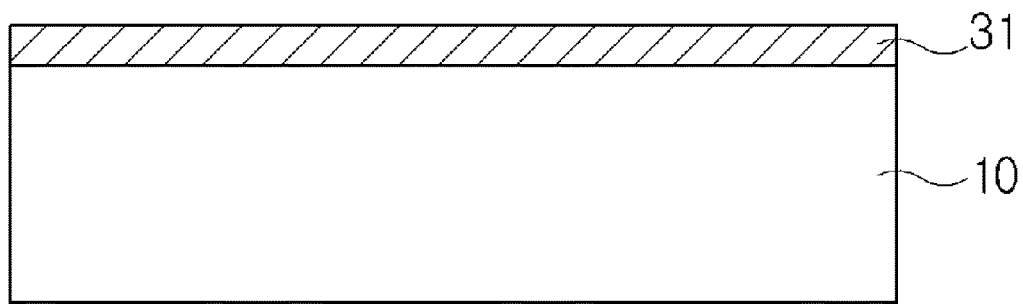
Figure 17C:
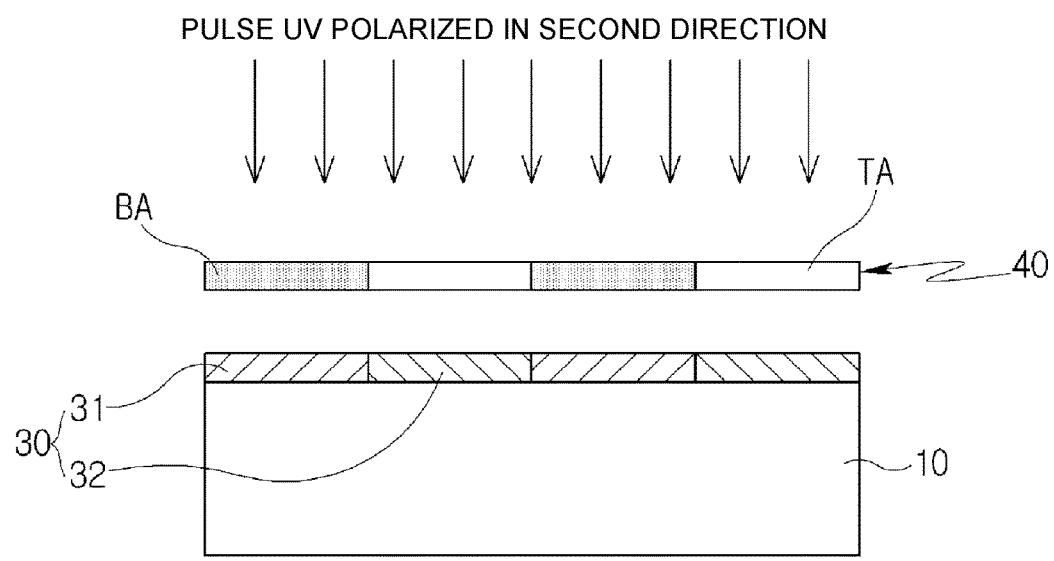

FIG. 16 is a flowchart illustrating a patterned retarder manufacturing method using polarized pulse UV according to an embodiment of the invention, and FIG. 17a to FIG. 17c are flowcharts illustrating stepwise a patterned retarder manufacturing method using polarized pulse UV according to an embodiment of the invention. Hereinafter, a patterned retarder manufacturing method using polarized pulse UV will be described with reference to FIG. 16 to FIG. 17c.

Substrate Preparing Method (S100):

A substrate 10 for forming multi-domains on a surface is prepared. The substrate 10 may be selected in various standards as necessary, and is formed of a transparent insulating substrate such as a glass substrate, a film, and a flexible substrate. In this case, the film may formed of any one of TAC (tri-acetate cellulose), COP (cyclo olefin polymer), COC (cyclic olefin copolymer), PVA (poly vinyl alcohol), PC (poly carbonate), PMMA (poly methyl methacrylate), PET (polyethylene terephthalate), PEN (polyethylene naphthalate), PES (polyethersulfone), PS (polystyrene), PI (poly imide), polyarylate, and PEEK (polyetheretherketon).

Meanwhile, the substrate 10 may include a photo-mask 40 for forming a multi-domain pattern.

Photoreactive Layer Forming Step (S200):

As illustrated in FIG. 17a, a photoreactive layer 20 that is an alignment film is formed by applying a photoreactive agent onto the surface of the prepared substrate 10. Herein, the photoreactive agent may be formed of, for example, a substance based on polyimide, polyvinyl, polysiloxane, and polyacryl including photoreaction such as cinnamate, syalkon, coumarin, stilbene, and diazo.

Multi-Domain Forming Step by Irradiation of Polarized Pulse UV (S300):

An optical alignment layer 30 in which a stripe-type first domain and second domain alternately continue is formed by irradiating the photoreactive layer 20 on the substrate 10 with polarized pulse UV. In this case, the first domain 31 is aligned in a first direction by polarized pulse UV polarized in the first direction (for example, 0°), and the second domain 32 is aligned in a second direction by polarized pulse UV polarized in the second direction (for example, 45° or 90°).

According to the embodiment of the invention, first, as illustrated in FIG. 17b, the whole area of the photoreactive layer 20 is irradiated with the polarized pulse UV polarized in the first direction, to form a first domain 31 having a state in which the photoreactive layer 20 is optically aligned in the first direction.

Next, as illustrated in FIG. 17c, a photo-mask 40 having a transmission area TA and a block area BA of light is positioned on the substrate 10, and the polarized pulse UV polarized in the second direction on the photo-mask 40 is irradiated vertically in a direction of the substrate 10. In this case, a second domain 32 having a state in which an area corresponding to the transmission area TA of the photo-mask 40 is partially exposed in the photoreactive layer 20 and is optically aligned in the second direction is formed.

In other words, the photoreactive layer 20 forms the optical alignment layer 30 in which the first domain 31 aligned in the first direction and the second domain aligned in the second direction alternately continue, through the whole face exposure step and the partial exposure step based on the polarized pulse UV.

In the embodiment described above, the first domain 31 and the second domain 32 having alignment different from each other are formed on the optical alignment layer 30 by the whole face exposure of the photoreactive layer 20 and the partial exposure using the photo-mask 40, but the method of forming the optical alignment layer 30 having multi-domains may be variously performed.

For example, primary exposure is performed using a first photo-mask in which an area corresponding to the first domain 31 is a transmission area TA and an area corresponding to the second domain 32 is a block area BA, and then secondary exposure is performed using a second photo-mask in which an area corresponding to the first domain 31 is a block area BA and an area corresponding to the second domain 32 is a transmission area TA, thereby forming multi-domains.

In addition, in contrast to the embodiment illustrated in FIG. 17b and FIG. 17c, there is also a method of, first, forming the first domain 31 by partial exposure, and then forming the second domain 32 by the whole face exposure.

However, the method of forming the multi-domains using the first photo-mask and the second photo-mask deteriorates in process as compared with the embodiment illustrated in FIG. 17b and FIG. 17c, and the method of forming the multi-domains by performing the partial exposure and then performing the whole face exposure deteriorates in alignment as compared with the FIG. 17b and FIG. 17c. This will be described later with reference to FIG. 18 to FIG. 21.

In the patterned retarder manufacturing method using polarized pulse UV according to the embodiment of the invention, the polarized pulse UV is used at the time of exposure for forming multi-domains.

Comparison of Alignment According to Multi-Domain Forming Method at Time of Polarized Pulse UV Exposure In order to compare alignment according to methods of forming multi-domains at the time of polarized pulse UV exposure, multi-domains were formed by three methods different from each other as follows.

In this case, a glass substrate or a triacetate (TAC) substrate was used as a substrate, and a photoreactive agent in which an optical alignment substance was dissolved in a 1% MEK/toluene organic solvent was applied onto the substrate to form a photoreactive layer.

In addition, the exposure for forming the multi-domains was performed by flash voltage of 3 kV, frequency of 50 Hz, and an exposure distance of 7 cm, and then reactive liquid crystal was dissolved in 12% toluene organic solvent, and was applied and dried.

Case 1

As the first method, a photoreactive layer was primarily exposed using a first photo-mask in which an area corresponding to a first domain is a transmission area and an area corresponding to a second domain is a block area, and then the photoreactive layer was secondarily exposure using a second photo-mask in which an area corresponding to a first domain is a block area and an area corresponding to a second domain is a transmission area, thereby forming multi-domains. In this case, the first domain was formed by the primary exposure of irradiating the polarized pulse UV polarized in the first direction, and the second domain was formed by the secondary exposure of irradiating the polarized pulse UV polarized in the second direction.

Case 2

As the second method, first, primary whole face exposure was performed by irradiating the whole area of a photoreactive layer with polarized pulse UV polarized in the first direction, and then secondary partial exposure was performed using a photo-mask in which an area corresponding to the first domain is a block area and an area corresponding to the second domain is a transmission area, thereby forming multi-domains. In this case, the first domain was formed by the primary whole face exposure of irradiating the polarized pulse UV polarized in the first direction, and the second domain was formed by the secondary partial exposure of irradiating the polarized pulse UV polarized in the second direction.

Case 3

The third method was performed in the order opposite to that of the second method, and, first, a first domain was formed by primary partial exposure, and then a second domain was formed by secondary whole face exposure. In other words, the photoreactive layer was primarily exposed using a photo-mask in which an area corresponding to the first domain is a transmission area and an area corresponding to the second domain is a block area, and then secondary whole face exposure was performed on the whole area of the photoreactive layer having the first domain formed by the partial exposure to form a second domain. In this case, at the time of the primary partial exposure, the photoreactive layer was irradiated with the polarized pulse UV polarized in the first direction through the photo-mask and, at the time of the secondary whole face exposure, the whole area of the photoreactive layer having the first domain formed partially was irradiated with the polarized pulse UV polarized in the second direction.

FIG. 18 is a polarized optical microscope photograph illustrating comparison of alignment according to 0°/45° multi-domain forming methods at the time of polarized pulse UV exposure.

The first domain and the second domain were optically aligned at 0° and 45°, respectively, by irradiating the photoreactive layer with the polarized pulse UV in three methods described above, and then were observed by a polarized optical microscope. As a result, a stripe-type black image and white image were alternately and clearly displayed in all of three methods. This indicates that the multi-domains including the first domain and the second domain are formed on the optical alignment layer, and thus it can be known that it is possible to manufacture the patterned retarder using the polarized pulse UV in the exposure process.

Figure 19:
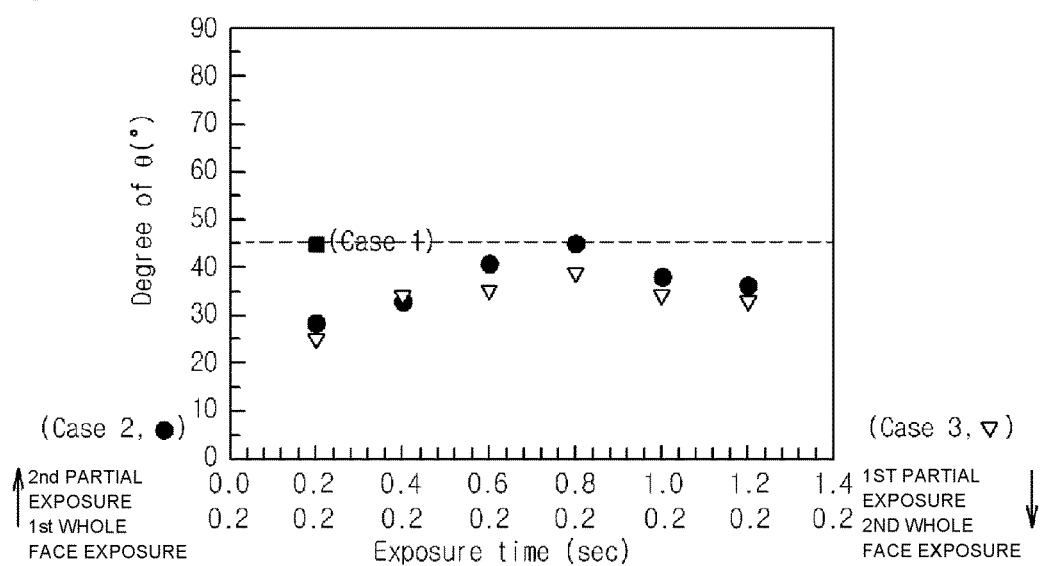
FIG. 19 is a graph illustrating comparison of alignment according to a 0°/45° multi-domain forming method at the time of polarized pulse UV exposure.

FIG. 19 is a graph illustrating comparison of alignment according to a 0°/45° multi-domain forming method at the time of polarized pulse UV exposure, and illustrates that an alignment angle θ according to an exposure time. In this case, the alignment angle θ illustrated in the figure indicates an angle between a liquid crystal optical axis aligned by the primary exposure and a liquid crystal optical axis aligned by the secondary exposure, an exposure time at the time of whole face exposure was 0.2 seconds, and an exposure time at the time of partial exposure was 0.2 seconds and 1.4 seconds.

In the case of the second method (Case 2), the alignment angle θ is increased while the secondary partial exposure time is increased, and the alignment angle θ was 45° when the exposure time was 0.8 seconds. In other words, it is preferable that the exposure time and the exposure energy at the time of secondary partial exposure are more than the exposure time and the exposure energy at the time of primary whole face exposure. Thereafter, the alignment angle θ is decreased while the secondary partial exposure time passes through 0.8 seconds. In the second method (Case 2), it can be seen that the alignment is most excellent when the primary whole face exposure time is 0.2 and the secondary partial exposure time is 0.8.

In the case of the third method (Case 3), the alignment angle θ is increased while the primary partial exposure time is increased, and then it can be seen that the alignment angle θ is decreased while the primary partial exposure time passes through 0.8 seconds. In other words, in the third method (Case 3), it can be seen that the alignment is most excellent when the primary partial exposure time is 0.8 seconds and the secondary whole face exposure time is 0.2 seconds. However, in the case of the third method (Case 3), since the alignment angle θ does not reach 45° irrespective of the exposure time, a result that the alignment is inferior to that of the second method (Case 2) is shown.

Furthermore, in the case of the first method, it is shown that the 45° alignment is achieved by the primary exposure of 0.2 seconds and the secondary exposure of 0.2 seconds, but the first photo-mask and the second photo-mask have to be separately prepared and managed, the first photo-mask and the second photo-mask have to be appropriately replaced in the course of the exposure process, and thus there is a problem that the first method deteriorates in process as compared with the second method (Case 2) and the third method (Case 3).

In other words, considering the alignment and the process comprehensively, the second method (Case 2) is more excellent than the first method (Case 1) and the third method (case 3).

Figure 20:
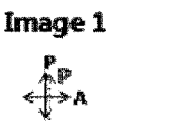
FIG. 20 is a polarized optical microscope photograph illustrating comparison of alignment according to a 0°/90° multi-domain forming method at the time of polarized pulse UV exposure.
Figure 21:
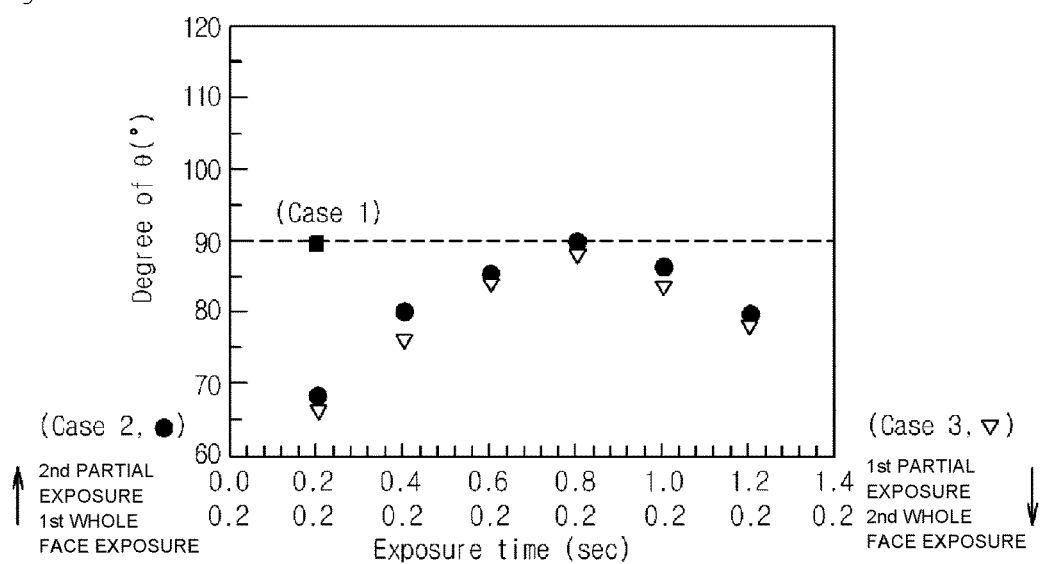
FIG. 21 is a graph illustrating comparison of alignment according to a 0°/90° multi-domain forming method at the time of polarized pulse UV exposure.

FIG. 20 is a polarized optical microscope photograph illustrating comparison of alignment according to a 0°/90° multi-domain forming method at the time of polarized pulse UV exposure, and FIG. 21 is a graph illustrating comparison of alignment according to a 0°/90° multi-domain forming method at the time of polarized pulse UV exposure.

Even when the alignment angle is changed to 90°, the result described above with reference to FIG. 18 and FIG. 19 was represented.

In other words, considering alignment and process, the second method (Case 2) showed the most excellent result, and the second method (Case 2) was most excellent in alignment at the primary whole face exposure time of 0.2 seconds and the secondary partial exposure time of 0.8 seconds.

Meanwhile, by the optical alignment method and the patterned retarder manufacturing method using polarized pulse UV, various applications may be manufactured. For example, an optical alignment layer optically aligned in at least one direction can be obtained by irradiating a photoreactive layer formed on a substrate with polarized pulse UV, and a film-type patterned retarder having an optical alignment film in which two domains optically aligned in directions different from each other alternately continue can be manufactured, particularly, by using a photo-mask. In addition, a liquid crystal display including such an optical alignment film can be manufactured.

Furthermore, an optical film (for example, $\lambda/4$ or $\lambda/2$ phase difference film, polarized film, etc.) having an optical alignment film formed by irradiating polarized pulse UV can be manufactured, and a three-dimensional display lens having a surface to which such an optical film is attached can be manufactured.

INDUSTRIAL APPLICABILITY

According to the optical alignment method and patterned retarder manufacturing method using polarized pulse UV according to the preferred embodiment of the invention, it is possible to reduce a time of forming an optical alignment layer or multi-domains by an exposure process using polarized pulse UV and to save energy consumption, and there is an advantage of improving productivity and easily achieving mass production.

Furthermore, since the polarized pulse UV is used, it can be made so that the optical alignment layer or the multi-domains has alignment and stability in alignment to have excellent phase difference performance.

The invention claimed is:
1. A method of providing optical alignment, the method comprising:
(a) providing a substrate;
(b) applying a photoreactive agent onto the substrate, thereby forming a photoreactive layer; and
(c) irradiating the photoreactive layer with polarized pulsed UV light from a UV lamp, thereby forming an optical alignment layer,
wherein a flash voltage of the polarized pulsed UV light is from 1 kV to 4 kV, wherein the time period for said irradiating the photoreactive layer with the polarized pulsed UV light is from 0.1 seconds to 10.0 seconds, and wherein a distance between a source of the polarized pulsed UV light and the photoreactive layer is from 0.5 cm to 10.0 cm.

2. The method according to claim 1, wherein the polarized pulsed UV light has an energy from 0.1 mJ/pulse to 500 J/pulse.

3. The method according to claim 1, wherein the polarized pulsed UV light is irradiated from 1 Hz to 60 Hz.

4. A method of manufacturing a patterned retarder, the method comprising:

providing a substrate;

applying a photoreactive agent onto the substrate, thereby forming a photoreactive layer; and exposing the photoreactive layer with polarized pulsed UV light from a UV lamp, thereby forming an optical alignment layer, wherein said optical alignment layer comprises a first domain and a second domain that are aligned in different direction and alternate to each other, and wherein the first domain is optically aligned in a first direction by the polarized pulsed UV light polarized in the first direction, and the second domain is optically aligned in a second direction by the polarized pulsed UV light polarized in the second direction, wherein a flash voltage of the polarized pulsed UV light is from 1 kV to 4 kV, wherein the time period for said exposing the photoreactive layer with the polarized pulsed UV light is from 0.1 seconds to 10.0 seconds, and wherein a distance between a source of the polarized pulsed UV light and the photoreactive layer is from 0.5 cm to 10.0 cm.

5. The method according to claim 4, wherein said exposing the photoreactive layer to the polarized pulsed UV light comprises:

exposing the entire face of the photoreactive layer with the polarized pulsed UV light polarized in the first direction; and irradiating the photoreactive layer with the polarized pulsed UV light polarized in the second direction, wherein in said irradiating in the second direction, the first domain, but not the second domain, of the photoreactive layer is blocked with a photo-mask, and therefore the second domain, but not the first domain, of the photoreactive layer is irradiated with the polarized pulsed UV light polarized in the second direction.

6. The method according to claim 5, wherein an irradiation time and an irradiation energy provided in said irradiating in the second direction are greater than an exposure time and an exposure energy provided in said exposing of the entire face of the photoreactive layer in the first direction.

7. The method according to claim 4, further comprising:

applying reactive liquid crystal onto the optical alignment layer; and drying and hardening the applied reactive liquid crystal.

8. The method according to claim 4, wherein the polarized pulsed UV light has an energy from 0.1 mJ/pulse to 500 J/pulse.

9. The method according to claim 4, wherein the polarized pulsed UV light is irradiated from 1 Hz to 60 Hz.

* * * * *